United States Patent
Ahn et al.

(10) Patent No.: US 8,705,396 B2
(45) Date of Patent: Apr. 22, 2014

(54) METHOD AND APPARATUS OF CONTROLLING UPLINK TRANSMISSION POWER

(75) Inventors: Joon Kui Ahn, Anyang-si (KR); Jung Hoon Lee, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 13/133,332

(22) PCT Filed: Dec. 23, 2009

(86) PCT No.: PCT/KR2009/007716
§ 371 (c)(1),
(2), (4) Date: Jun. 7, 2011

(87) PCT Pub. No.: WO2010/074504
PCT Pub. Date: Jul. 1, 2010

(65) Prior Publication Data
US 2011/0243087 A1    Oct. 6, 2011

Related U.S. Application Data

(60) Provisional application No. 61/140,081, filed on Dec. 23, 2008.

(30) Foreign Application Priority Data

Nov. 9, 2009   (KR) .................... 10-2009-0107505

(51) Int. Cl.
*H04L 1/00* (2006.01)
(52) U.S. Cl.
USPC ............ 370/252; 370/255; 370/329; 455/522

(58) Field of Classification Search
USPC ......... 370/252, 254, 255, 310, 328, 329, 338, 370/389, 400, 401, 431, 464, 465; 455/522, 455/450
See application file for complete search history.

(56) References Cited

U.S. PATENT DOCUMENTS

| | | | |
|---|---|---|---|
| 8,351,974 B2* | 1/2013 | Ahn et al. ................. | 455/522 |
| 2002/0061764 A1 | 5/2002 | Kim et al. | |
| 2004/0087328 A1* | 5/2004 | Ronkainen ................. | 455/522 |
| 2006/0035660 A1 | 2/2006 | Anderson | |
| 2006/0166690 A1 | 7/2006 | Nishio et al. | |
| 2008/0200203 A1* | 8/2008 | Malladi et al. ............ | 455/522 |
| 2009/0143072 A1* | 6/2009 | Montojo et al. ........... | 455/450 |

FOREIGN PATENT DOCUMENTS

KR   10-2001-0038996 A   5/2001

* cited by examiner

*Primary Examiner* — Yemane Mesfin
*Assistant Examiner* — Mon Cheri Davenport
(74) *Attorney, Agent, or Firm* — Birch, Stewart, Kolasch & Birch, LLP

(57) ABSTRACT

A wireless communication system is disclosed. Specifically, a method of transmitting signals from a user equipment in a wireless communication system that supports carrier aggregation comprises receiving downlink scheduling information from a base station through a control channel of a first downlink component carrier, the downlink scheduling information including an uplink transmission power control (TPC) command; receiving downlink data from the base station through a shared channel of a second downlink component carrier, the shared channel being connected with the downlink scheduling information; adjusting transmission power of an uplink component carrier corresponding to the first downlink component carrier in accordance with the uplink TPC command; and transmitting acknowledgement (ACK) information of the downlink data to the base station through the uplink component carrier.

4 Claims, 18 Drawing Sheets

FIG. 2
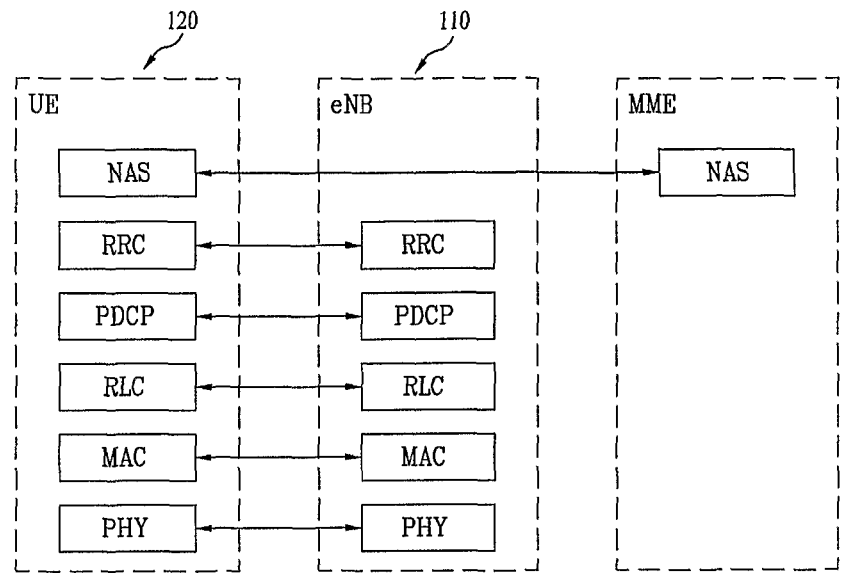
(a) Control-plane protocol stack
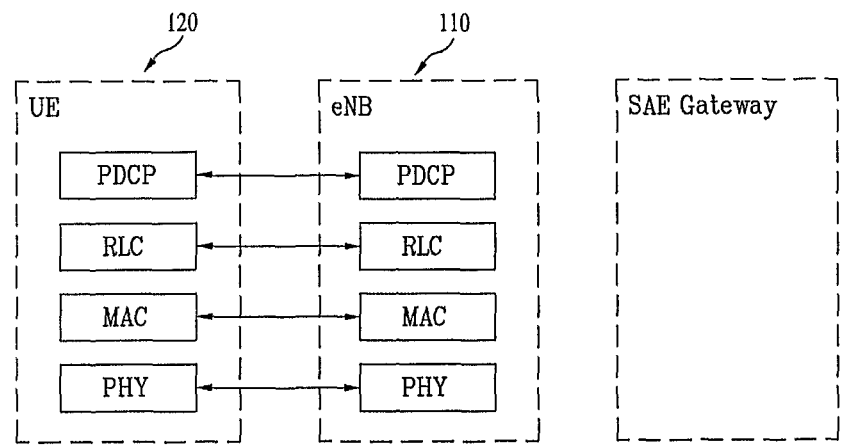
(b) User-plane protocol stack Single component carrier (LTE system)

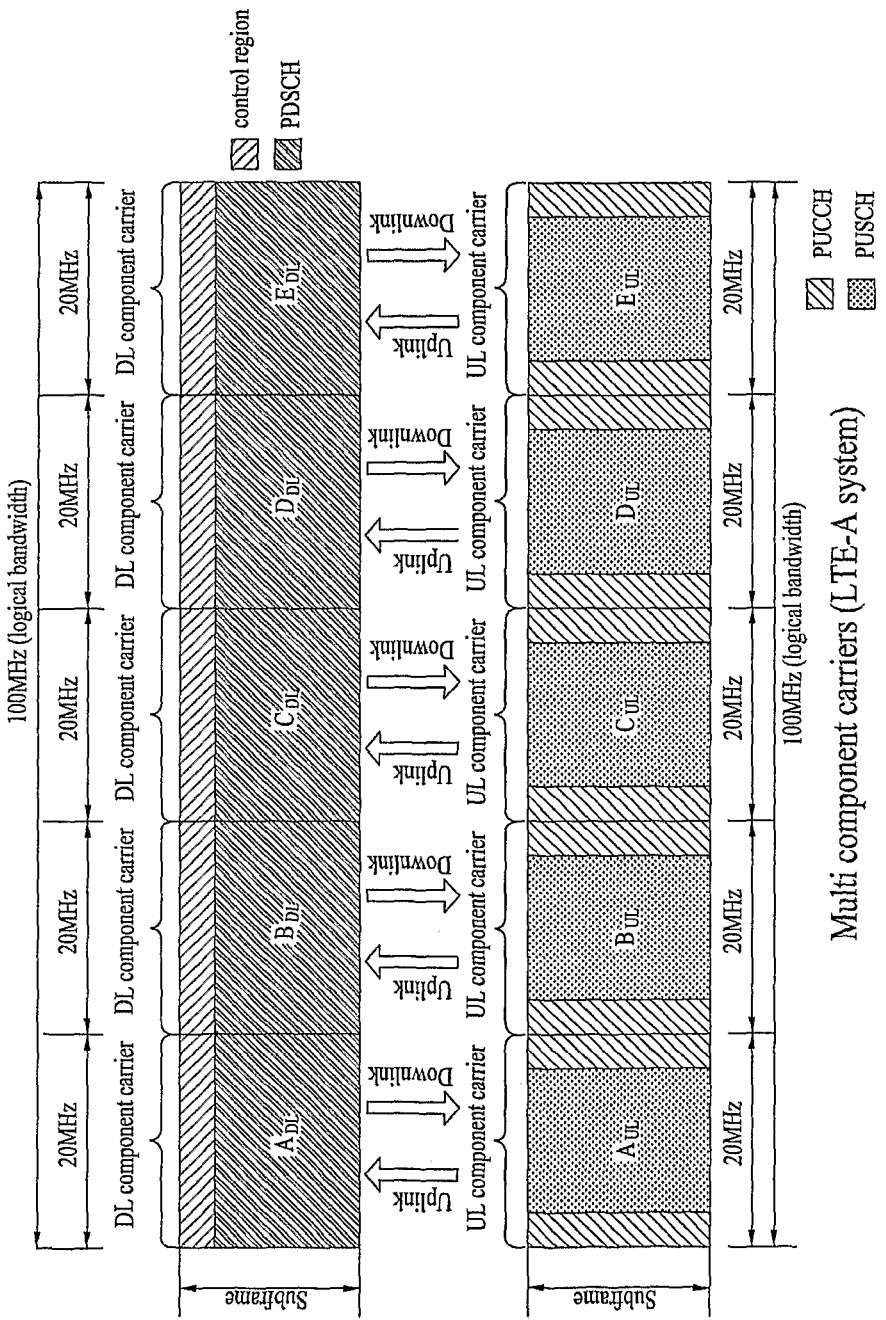

* DL transmission* : a component carrier associated with the TPC command is
  implicitly indicated by PDCCH scrambling or CRC masking method

* PDCCH format 'A' indicates the TPC command is for a wideband
* PDCCH format 'B' indicates the TPC command is for an individual CC

METHOD AND APPARATUS OF CONTROLLING UPLINK TRANSMISSION POWER

This application is the National Phase of PCT/KR2009/007716 filed on Dec. 23, 2009, which claims the benefit under 35 U.S.C. 119(e) of U.S. Provisional Application No. 61/140,081 filed on Dec. 23, 2008, and claims priority under 35 U.S.C. 119 (a) to Patent Application No. 10-2009-0107505 filed in Republic of Korea on Nov. 9, 2009, all of which are hereby expressly incorporated by reference into the present application.

DETAILED DESCRIPTION OF THE INVENTION

1. Technical Field

The present invention relates to a wireless communication system, and more particularly, to a method and apparatus of controlling uplink transmission power when a plurality of uplink/downlink component carriers configure uplink/downlink.

2. Background Art

FIG. 1 is a diagram illustrating a network structure of an Evolved Universal Mobile Telecommunications System (E-UMTS). The E-UMTS is an evolved version of a WCDMA UMTS, and its basic standardization is in progress under the 3rd Generation Partnership Project (3GPP). The E-UMTS may also be referred to as a Long Term Evolution (LTE) system. For details of the technical specifications of the UMTS and the E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify information related to time and frequency domains to which data will be transmitted, encoding, data size, and hybrid automatic repeat and request (HARQ). Also, the base station transmits uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

DESCRIPTION OF THE INVENTION

Technical Problems

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, the carrier aggregation aims to use greater uplink/downlink bandwidths by collecting a plurality of uplink/downlink frequency blocks. A bandwidth of each frequency block can be defined based on a bandwidth of a system block used in the LTE system. Each frequency block is transmitted using a component carrier (CC). Herein, the component carrier may mean a frequency block for carrier aggregation or a center carrier of the frequency block depending on the context. The component carrier and the center carrier may be used together. The 3GPP LTE-A system which is currently designed can support greater uplink/downlink by collecting a plurality of component carriers of maximum 20 MHz bandwidth in uplink/downlink.

Accordingly, the present invention has been devised to substantially obviate one or more problems due to limitations and disadvantages of the related art. An object of the present invention is to provide a method and apparatus of efficiently controlling uplink transmission power in a wireless communication system.

It is to be understood that technical problems to be solved by the present invention are not limited to the aforementioned technical problems and other technical problems which are not mentioned will be apparent from the following description to the person with an ordinary skill in the art to which the present invention pertains.

Technical Solutions

To achieve the aforementioned objects of the present invention, in a first aspect of the present invention, a method of transmitting signals from a user equipment in a wireless communication system that supports carrier aggregation comprises receiving downlink scheduling information from a base station through a control channel of a first downlink component carrier, the downlink scheduling information including an uplink transmission power control (TPC) command; receiving downlink data from the base station through a shared channel of a second downlink component carrier, the shared channel being connected with the downlink scheduling information; adjusting transmission power of an uplink component carrier corresponding to the first downlink component carrier in accordance with the uplink TPC command; and transmitting acknowledgement (ACK) information of the downlink data to the base station through the uplink component carrier. In this case, the first downlink component carrier and the second downlink component carrier are different from each other. Also, the control channel is a physical downlink control channel (PDCCH), and the shared channel is a physical downlink shared channel (PDSCH).

In a second aspect of the present invention, a method of transmitting signals from a user equipment in a wireless communication system that supports carrier aggregation comprises identifying a specific uplink component carrier for transmitting a physical uplink control channel (PUCCH), among a plurality of uplink component carriers; receiving downlink control information associated with a PUCCH from a base station through a physical downlink control channel (PDCCH); adjusting the transmission power of the specific uplink component carrier in accordance with an uplink transmission power control (TPC) command on the PDCCH; and transmitting uplink control information to the base station through the PUCCH of the specific uplink component carrier of which transmission power has been adjusted. In this case, the downlink control information associated with the PUCCH includes downlink scheduling information, and the uplink control information includes acknowledgement (ACK) information. Also, the downlink control information associated with the PUCCH includes TPC dedicated information for PUCCH.

In a third aspect of the present invention, a method of transmitting signals from a user equipment in a wireless communication system that supports carrier aggregation comprises receiving an uplink transmission power control (TPC) command from a base station through a physical downlink control channel (PDCCH); adjusting transmission power of a specific uplink component carrier designated through the PDCCH, among a plurality of uplink component carriers, in accordance with the TPC command; and transmitting uplink signals to the base station through the specific uplink component carrier. In this case, the specific uplink component carrier is designated by an indicator transmitted onto the PDCCH. Also, the specific uplink component carrier is designated in accordance with a scrambling scheme of the PDCCH or a cyclic redundancy check (CRC) masking scheme.

In a fourth aspect of the present invention, a method of controlling uplink transmission power from a user equipment in a wireless communication system that supports carrier aggregation comprises receiving a first transmission power control (TPC) command of an uplink component carrier from a base station; receiving a second TPC command of the uplink component carrier from the base station; and if the first TPC command and the second TPC command are received at the same transmission time interval (TTI) but indicate different values, maintaining the transmission power of the uplink component carrier at a previous value. The first TPC command and the second TPC command may be TPC commands of an individual uplink component carrier. The first TPC command and the second TPC command may be TPC commands of an uplink wideband, wherein the uplink wideband including a plurality of component carriers. In this case, uplink component carriers associated with the first and second TPC commands are overlapped each other at least in part. In this case, the first TPC command and the second TPC command are received through physical downlink control channels (PDCCH) of different downlink component carriers.

In a fifth aspect of the present invention, a method of transmitting signals from a user equipment in a wireless communication system that supports carrier aggregation comprises receiving an uplink transmission power control (TPC) command from a base station through a physical downlink control channel (PDCCH); selectively controlling transmission power of an uplink wideband or transmission power of a certain uplink component carrier in accordance with the TPC command, based on a type of the TPC command, the uplink wideband including a plurality of uplink component carriers; and transmitting uplink signals to the base station through one or more uplink component carriers of which transmission power is adjusted. In this case, the type of the TPC command is signaled through a radio resource control (RRC) message or system information. Alternatively the type of the TPC command is dynamically signaled using PDCCH. In this case, the type of the TPC command can be explicitly signaled using a TPC type indicator (e.g. 1-bit indication) in PDCCH information (e.g. scheduling information). The type of the TPC command can be implicitly signaled using PDCCH scrambling, cyclic redundancy check (CRC) masking, etc.

Also, the type of the TPC command is designated in accordance with a format of the PDCCH. In this case, if the format of the PDCCH is a TPC dedicated format, the transmission power of the uplink wideband is controlled in accordance with the TPC command, the uplink wideband including a plurality of uplink component carriers.

Advantageous Effects

According to the embodiments of the present invention, the uplink transmission power can be adjusted efficiently in a wireless communication system that uses a plurality of component carriers.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a radio interface protocol between a user equipment and E-UTRAN based on the 3GPP radio access network standard;

FIG. 7A and FIG. 7B are diagrams illustrating examples of communication under a single component carrier and a plurality of component carriers;

BEST MODE FOR CARRYING OUT THE INVENTION

Figure 1:
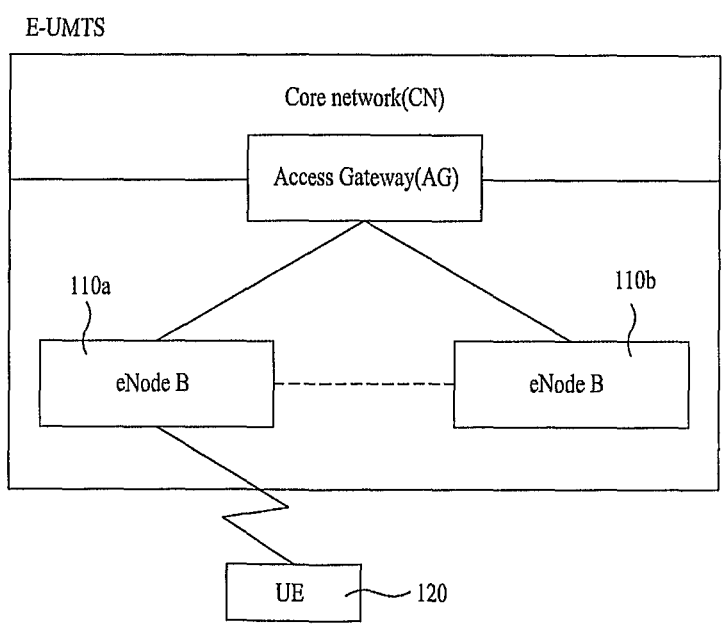
FIG. 1 is a diagram illustrating a network structure of an Evolved Universal Mobile Telecommunications System (E-UMTS)

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as that of the system block of the legacy system. On the other hand, there is no limitation in sizes of the other frequency blocks. However, for system simplification, the sizes of the other frequency blocks may be determined based on the size of the system block of the legacy system. For example, the 3GPP LTE (Release-8) system and the 3GPP LTE-A (Release-9) system are evolved from the legacy system.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. For example, various modifications can be made in the embodiments of the present invention for application to the IEEE 802.16 system. Also, although the embodiment of the present invention will herein be described based on a frequency division multiplexing (FDD) mode, the FDD mode is only exemplary and the embodiment of the present invention can easily be applied to a half-FDD (H-FDD) mode or a time division multiplexing (TDD) mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as a first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of a second layer provides a service to a radio link control (RLC) layer above the MAC layer via a logical channel. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of a third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layers of the user equipment and the network exchange RRC messages with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
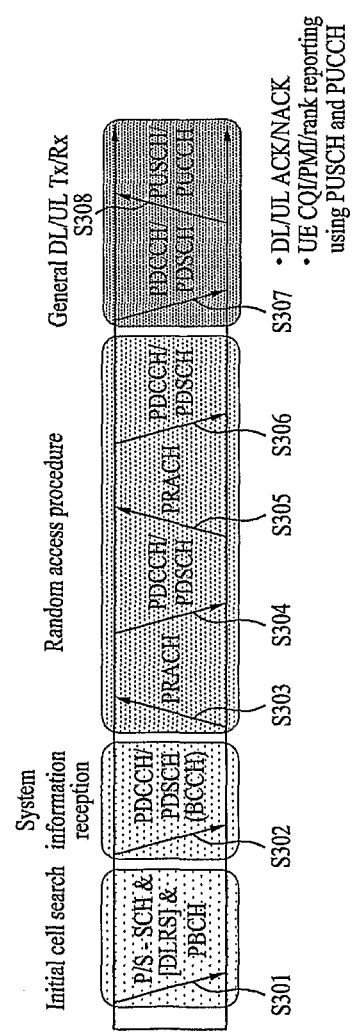
FIG. 3 is a diagram illustrating physical channels used in a 3GPP system and a method for transmitting a general signal using the physical channels.

FIG. 3 is a diagram illustrating physical channels used in a LTE system and a method for transmitting a general signal using the physical channel.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station.

The user equipment which has finished the initial cell search can acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a specific sequence to a preamble through a physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as a procedure of transmitting general uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Figure 4:
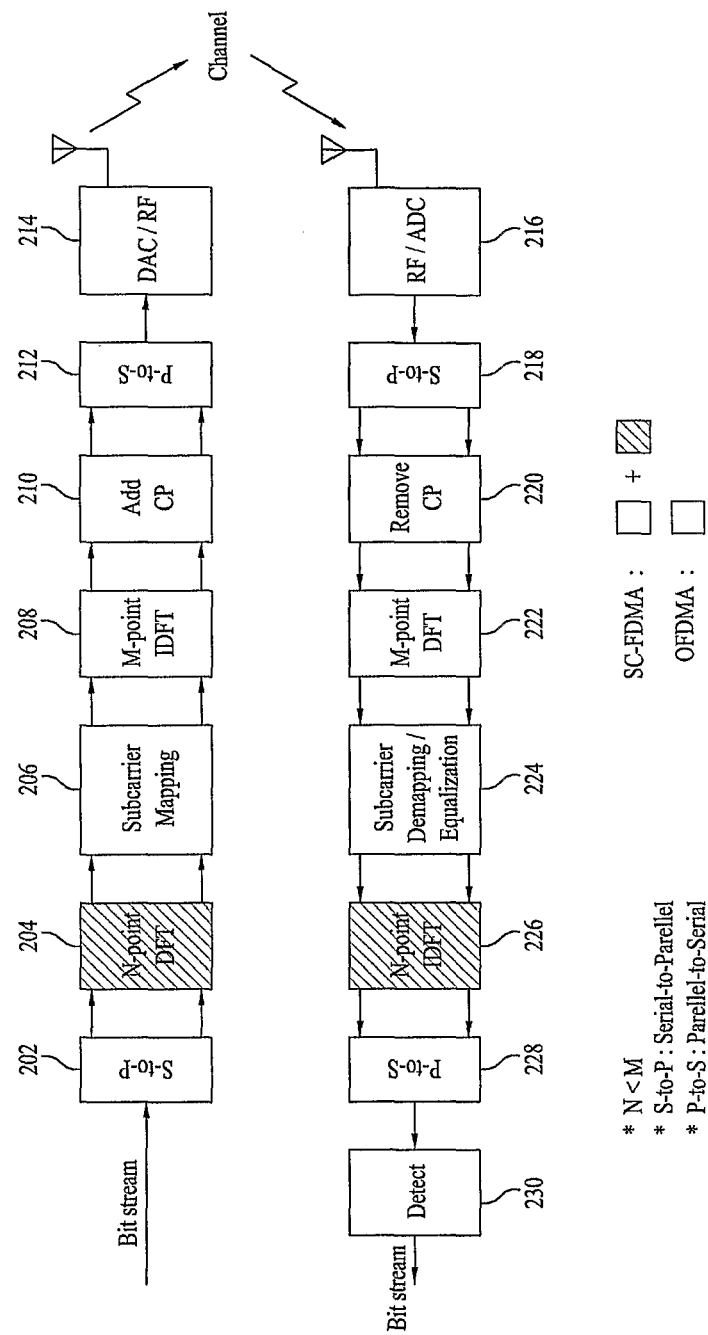
FIG. 4 is a block diagram illustrating a transmitter and a receiver for OFDMA and SC-FDMA.

FIG. 4 is a block diagram illustrating a transmitter and a receiver for OFDMA and SC-FDMA. In the uplink, transmitters 202 to 214 are parts of the user equipment, and receivers 216 to 230 are parts of the base station. In the downlink, the transmitters are parts of the base station, and the receivers are parts of the user equipment.

Referring to FIG. 4, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (202). N number of data symbols are mapped with N number of subcarriers allocated among a total of M number of subcarriers, and the other M−N number of carriers are padded with 0 (206). The data symbols mapped in a frequency domain are converted to time region sequences through M-point IDFT processing (S208). Afterwards, in order to reduce inter-symbol interference (ISI) and inter-carrier interference (ICI), cyclic prefix is added to the time region sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. On the other hand, the OFDMA receiver includes an RF/ADC (analog to digital converter) module 216, a discrete fourier transform (DFT) module 222, a subcarrier demapping/equalization module 224, a parallel-to-digital converter 228, and a detection module 230. A signal processing procedure of the OFDMA receiver will be configured in reverse order of the OFDMA transmitter.

Meanwhile, as compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 226 after the subcarrier demapping module 224. A signal processing procedure of the SC-FDMA receiver will be configured in reverse order of the SC-FDMA transmitter.

The modules illustrated in FIG. 4 are illustrative, and the transmitter and/or the receiver may further include necessary modules. Some modules/functions may be omitted or may be divided into different modules, and two or more modules may be incorporated into one module. A structure of a radio frame will now be described.

Figure 5:
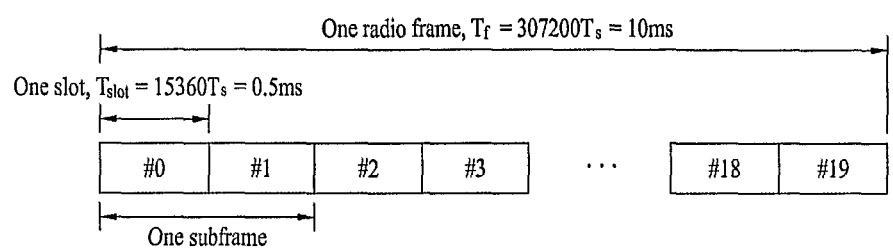
FIG. 5 is a diagram illustrating a structure of a radio frame used in an LTE system.

FIG. 5 is a diagram illustrating a structure of a radio frame used in the LTE system.

Referring to FIG. 5, the radio frame has a length of 10 ms (327200·$T_s$) and includes 10 subframes of an equal size. Each sub frame has a length of 1 ms and includes two slots. Each slot has a length of 0.5 ms (15360·$T_s$). In this case, $T_s$ represents a sampling time, and is expressed by $T_s$=1/(15 kHz× 2048)=3.2552×$10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 6:
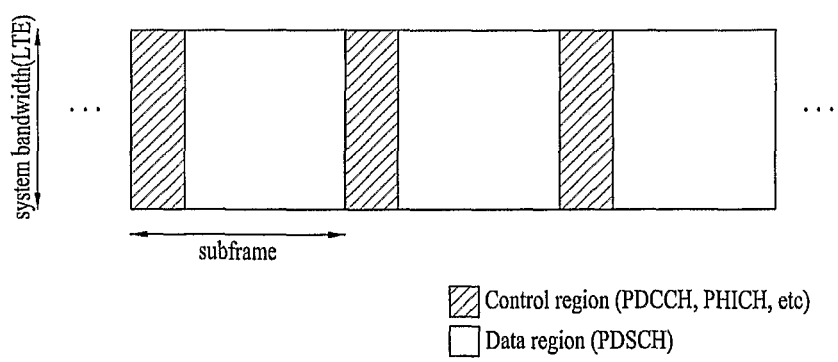
FIG. 6 is a diagram illustrating a structure of a downlink radio frame used in an LTE system.

FIG. 6 is a diagram illustrating a structure of a downlink radio frame used in an LTE system.

Referring to FIG. 6, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region can have a size set independently per subframe. The control region is used to transmit L1/L2 (layer 1/layer 2) control signals. The data region is used to transmit downlink traffic.

Figure 7A:
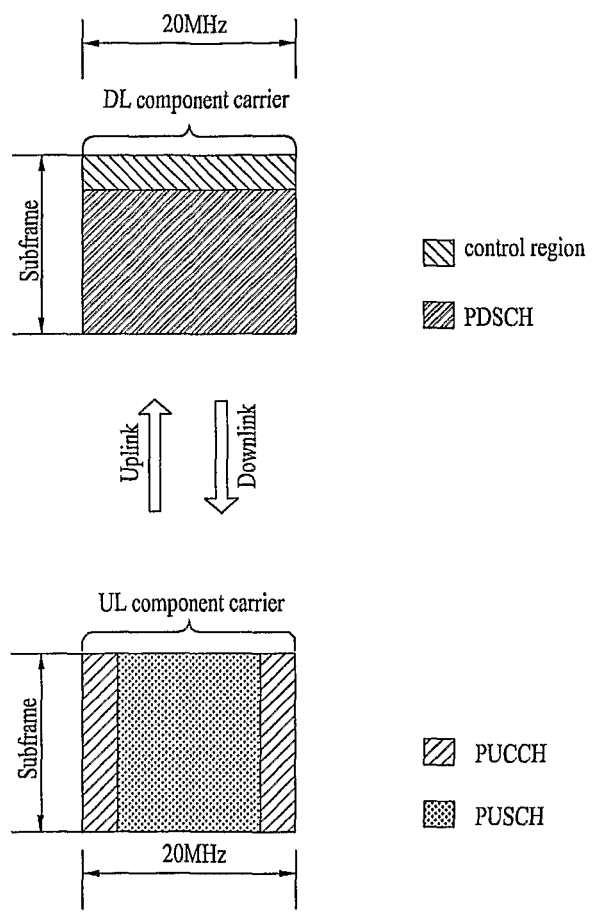

FIG. 7A is a diagram illustrating an example of communication under a single component carrier. FIG. 7A corresponds to a communication example of the LTE system.

Referring to FIG. 7A, a general FDD wireless communication system performs data transmission and reception through one downlink band and one uplink band corresponding to the downlink band. For uplink power control, the base station transmits a transmit power control (TPC) command to the user equipment during or after the initial access procedure of the user equipment. The TPC command may be included in the response message to the preamble for random access, or may be transmitted through the PDCCH. Various formats may exist in the PDCCH depending on downlink control information (DCI), and the TPC command may be varied depending on the formats. Specifically, in the LTE system, the user equipment should receive a PDCCH of various formats such as a format for downlink scheduling, a format for uplink scheduling, a TPC dedicated format for uplink data channel (PUSCH), and a TPC dedicated format for uplink control channel (PUCCH). Each PDCCH format can carry a 2-bit TPC command. The TPC command controls uplink power in accordance with an accumulative scheme or an absolute value scheme. The TPC dedicated format includes a plurality of TPC command, and can be applied to a plurality of user equipments having the same group RNTI.

FIG. 7B is a diagram illustrating an example of communication performed under a plurality of component carriers.

Referring to FIG. 7B, five component carriers (CCs) of 20 MHz are collected in the uplink/downlink to support a bandwidth of 100 MHz. In FIG. 7B, the uplink bandwidth is symmetrical to the downlink bandwidth. However, the uplink bandwidth may be asymmetrical to the downlink bandwidth. The asymmetrical frequency bandwidth may occur due to a limit of available frequency band, or may be configured artificially by network establishment. For example, even though N number of CCs are configured in the entire system band, a frequency band that can be received by a specific user equipment can be limited to M (<N) number of CCs. The asymmetrical frequency bandwidth can be set in accordance with a cell-specific scheme, a UE group-specific scheme, or a UE-specific scheme.

If the number of uplink component carriers (UL CCs) is equal to that of downlink component carriers (DL CCs), one UL CC can correspond to one DL CC one to one. If the number of uplink component carriers (UL CCs) is greater than that of downlink component carriers (DL CCs), one UL CC can correspond to a plurality of DL CCs. The correspondence relationship between the DL CC and the UL CC can be defined by a rule previously defined in the standard. Also, the correspondence relationship between the DL CC and the UL CC may be signaled for each user equipment through RRC message, or may commonly be applied to all user equipments within a cell through a broadcast message. If a plurality of UL CCs configure a wideband uplink, since independence of radio channel response between the respective UL CCs increases, uplink TPC can be required for each CC. In the existing LTE system, the uplink TPC command is transmitted through the downlink control channel, i.e., PDCCH. In this case, if TPC is performed for each CC of one user equipment, load of the downlink control channel for TPC increases. Considering this, the present invention suggests TPC schemes for a plurality of UL CCs.

Hereinafter, the embodiment of the present invention will be described with reference to the accompanying drawings. For convenience, it is assumed that the TPC command is transmitted through the PDCCH. However, this is only exemplary, and the TPC command may be transmitted through a response of the base station to an initial access request of the user equipment. For example, the TPC command can be transmitted through a response message to a random access preamble or a ranging process. In this case, proper modifications can be made in the following examples using the PDCCH in accordance with the random access process or the ranging process. Also, for convenience, it is assumed that three uplink component carriers and three downlink component carriers are provided, wherein one uplink component carrier is mapped with one downlink component carrier. However, this is only exemplary, and the number of component carriers in the uplink and the downlink can be set independently. Accordingly, the number of uplink component carriers may be asymmetrical to the number of downlink component carriers. In this case, the uplink component carriers can be mapped with the downlink component carriers one to one.

Embodiment 1

TPC Per Cc Scheme

FIG. 8 to FIG. 11 are diagrams illustrating examples that transmission power is adjusted in a component carrier unit in accordance with the embodiment of the present invention. In this embodiment, a TPC command transmitted to the user equipment controls transmission power of one uplink component carrier (UL CC). For convenience, this type of TP command can be referred to a single CC TPC command.

Figure 8:
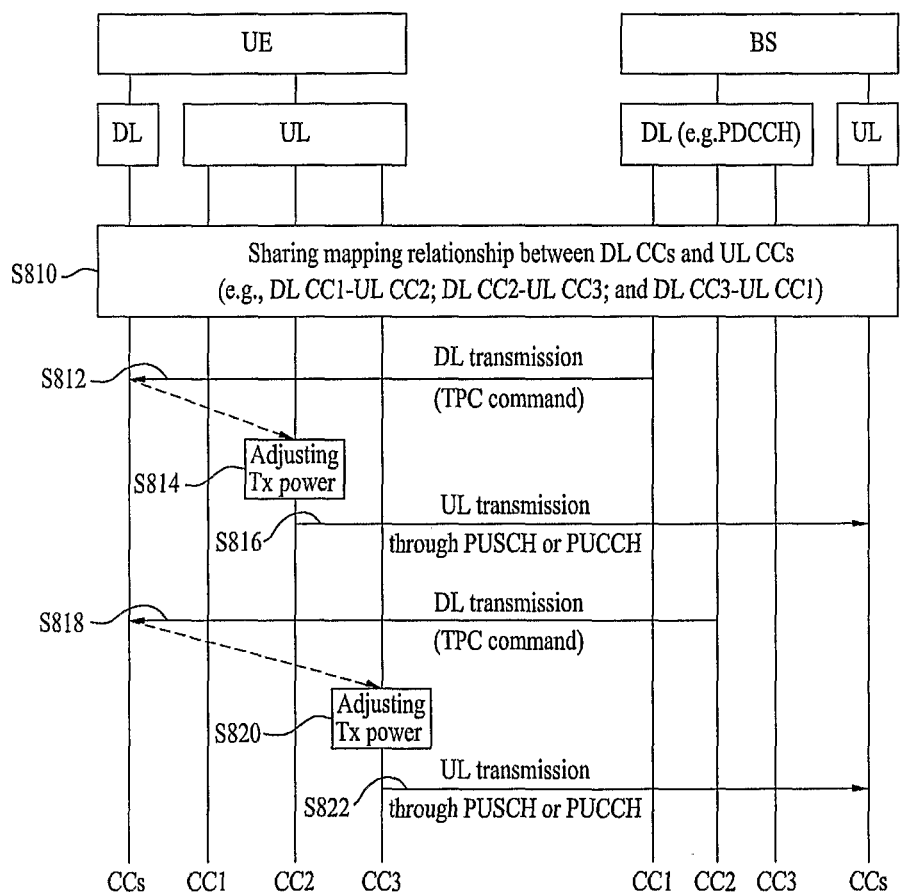
FIG. 8 to FIG. 11 are diagrams illustrating examples that transmission power is adjusted in a component carrier unit in accordance with the embodiment of the present invention.

FIG. 8 illustrates that a TPC command transmitted through a PDCCH is applied to only an uplink CC corresponding to a downlink component carrier (DL CC) related with the PDCCH.

Referring to FIG. 8, the user equipment and the base station share information of the mapping relationship between the downlink component carrier (DL CC) and the uplink component carrier (UL CC) (S810). The information of the mapping relationship between the DL CC and the UL CC can be determined implicitly using uplink/downlink bandwidth, the number and/or bandwidth of DL CCs, and the number and/or bandwidth of UL CCs. Also, the information of the mapping relationship can be determined in accordance with a previously defined scheme using cell ID or UE ID. Also, the information of the mapping relationship can be shared explicitly through signaling. In this case, the information of the mapping relationship can be signaled cell-specifically using system information. Also, the information of the mapping relationship can be signaled UE-specifically using RRC message. Moreover, the information of the mapping relationship can be time-varied. For description, it is assumed that component carriers are mapped with one another (DL CC1 to UL CC2, DL CC2 to UL CC3, and DL CC3 to UL CC1).

In this embodiment, if the user equipment receives the TPC command through the PDCCH, it applies the TPC command to a UL CC corresponding to the DL CC via which the corresponding PDCCH has received. Alternatively, if the user equipment receives the TPC command through a PDCCH for scheduling PDSCH, i.e. a PDCCH for downlink scheduling, it may apply the TPC command to a UL CC corresponding to the DL CC via which the PDSCH scheduled by the corresponding PDCCH is received (not shown). Alternatively, if the user equipment receives the TPC command through the PDCCH for scheduling PDSCH, it may apply the TPC command to a UL CC used for transmitting ACK/NACK in response to the scheduled PDSCH (not shown).

Accordingly, if the TPC command is received through the DL CC1 (S812), the user equipment controls the transmission power of the UL CC2 corresponding to the DL CC1 in accordance with the TPC command (S814) and then performs uplink transmission with the adjusted transmission power if necessary (S816). Similarly, if the TPC command is received through the DL CC2 (S818), the user equipment adjusts the transmission power of the UL CC1 corresponding to the DL CC2 in accordance with the TPC command (S820) and then performs uplink transmission with the adjusted transmission power if necessary (S822). The uplink transmission can be performed through a shared channel for data transmission or a control channel. For example, the uplink transmission can be performed through the PUSCH or PUCCH.

Meanwhile, the TPC command can be received through the PDCCH of various formats. For example, the TPC command can be transmitted through a format for downlink scheduling, a format for uplink scheduling, a TPC dedicated format for uplink data channel (for example, PUSCH), and a TPC dedicated format for uplink control channel (for example, PUCCH). Accordingly, the user equipment should receive the PDCCH of various formats to receive the TPC command. Since this embodiment uses relationship between DL CC and UL CC, a PDCCH associated with downlink transmission may be preferably used. For example, the PDCCH for downlink scheduling (i.e. PDSCH scheduling) can be preferably used.

If the PDCCH for downlink scheduling is used, the PDCCH including the TPC command and a PDSCH scheduled by the PDCCH may be received through different DL CCs (e.g. PDCCH—DL CC1, PDSCH—DL CC2). In this case, if it is assumed that the TPC command is applied to a UL CC corresponding to the DL CC via which the scheduled PDSCH is received, the user equipment may control the transmission power of the UL CC3 corresponding to the DL CC2 in accordance with the TPC command.

Figure 9:
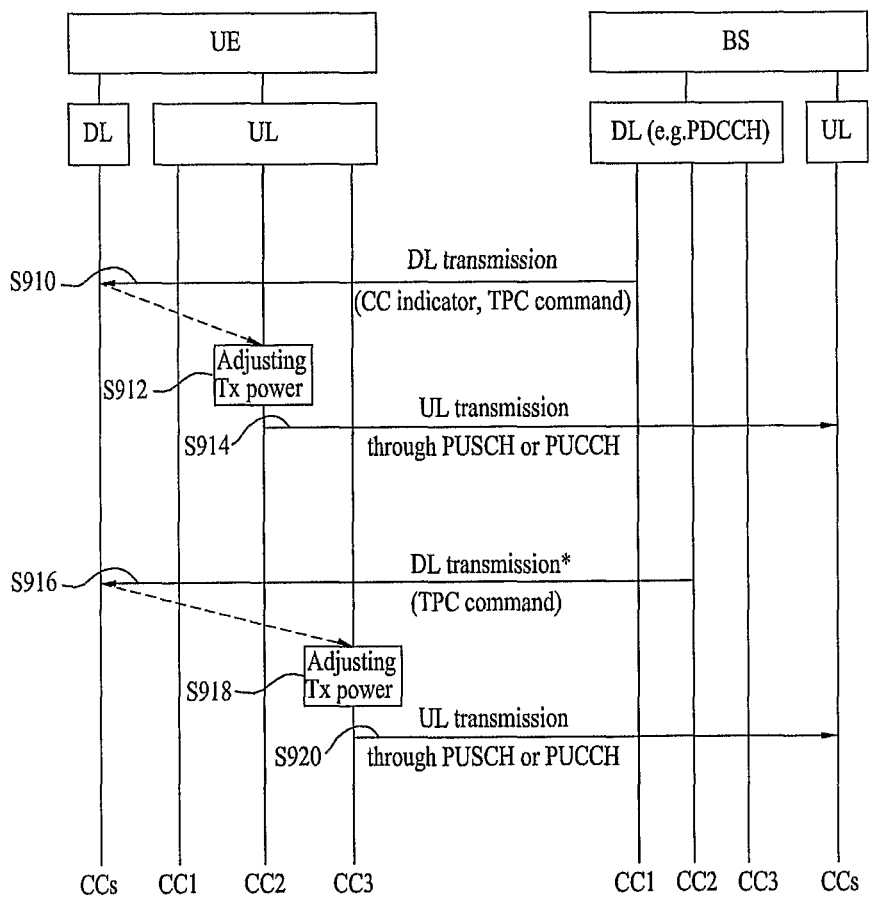

FIG. 9 illustrates a scheme of signaling UL CC to which a TPC will be applied through a PDCCH.

Referring to FIG. 9, the user equipment receives the TPC command from the base station through the PDCCH (S910 and S916). In this embodiment, the UL CC to which the TPC command will be applied is designated through the PDCCH. This embodiment exemplarily illustrates two types. The first type is illustrated in steps S910 to S914, and the second type is illustrated in steps S916 to S920. A PDCCH for uplink scheduling (for example, PDSCH scheduling), a TPC dedicated PUCCH for uplink data channel (for example, PUSCH) or a TPC dedicated PDCCH for uplink control channel (for example, PUCCH) can be preferably used in this embodiment.

The first type illustrates that PDCCH information carrying the TPC command directly includes information of the UL CC to which the TPC command will be applied (S910). If the PDCCH carries information of uplink scheduling, the information of the UL CC to which the TPC command will be applied can be replaced with information of UL CC to which an uplink scheduling command will be applied. For example, if the wireless communication system supports maximum five UL CCs, the PDCCH information can include a 3-bit CC indicator for indicating the UL CC to which the TPC command will be applied. Since the 3-bit CC indicator can indicate eight states, three states remaining after one-to-one mapping with UL CC can be used to indicate a wideband (or fullband) TPC command. For example, assuming that there can be up to five uplink component carrier and 3-bit CC indicator is used, the CC indicator can be used in view of TPC command as exemplified in the table below:

TABLE 1 mapping between UL CC and TPC command using CC indicator

| Value | Original Use | Interpretation for TPC command |
|---|---|---|
| 0b000 | Indicating UL CC1 | Individual TPC command for UL CC1 |
| 0b001 | Indicating UL CC2 | Individual TPC command for UL CC2 |
| 0b010 | Indicating UL CC3 | Individual TPC command for UL CC3 |
| 0b011 | Indicating UL CC4 | Individual TPC command for UL CC4 |
| 0b100 | Indicating UL CC5 | Individual TPC command for UL CC5 |
| 0b101 | Reserved | Wideband TPC command for whole UL CCs or UL CC group |
| 0b110 | Reserved | |
| 0b111 | Reserved | |

In the table, one or more states of the remaining three states may be used for indicating a wideband TPC command. If a plurality of states are used for a wideband TPC command, any combination of TPC command of whole UL CCs (i.e. uplink fullband) ($TPC_{FB}$) and TPC command of UL CC group ($TPC_{CCgp}$) can be mapped to the remaining states, e.g. {0b101, 0b110, 0b111}={reserved, $TPC_{FB}$, $TPC_{CCgp}$}, {$TPC_{FB}$, $TPC_{CCgp\_1}$, $TPC_{CCgp\_2}$}, {$TPC_{CCgp\_1}$, $TPC_{CCgp\_2}$, reserved} or {$TPC_{CCgp\_1}$, $TPC_{CCgp\_2}$, $TPC_{CCgp\_3}$}. The meaning of the remaining three states may be broadcast using system information or semi-statically signaled using an RRC message. Moreover, the values in the CC indicator field may be grey coded to obtain additional gain.

Also, the PDCCH information includes a 5-bit bitmap for indicating UL CC, wherein the respective bits are mapped with the UL CCs one to one. If a plurality of bits of the bitmap are set for TPC application, they can be used to indicate the wideband TPC command which will be described later.

The second type illustrates that the information of the UL CC to which the TPC command will be applied is transmitted indirectly or implicitly (S916). For example, the information of the UL CC to which the TPC command will be applied can be transmitted indirectly or implicitly using PDCCH scrambling, cyclic redundancy check (CRC) masking, etc. In case of the LTE system, the PDCCH is CRC masked using radio network temporary identifier (RNTI). Accordingly, for compatibility with the LTE system, the PDCCH can be CRC masked using RNTI additionally obtained for the UL CC. Also, the PDCCH can be CRC masked using RNTI having given offset depending on the UL CC to which the TPC command will be applied. Examples of the RNTI include cell-RNTI (C-RNTI), temporary cell-RNTI (TC-RNTI), random access-RNTI (RA-RNTI), and UE group RNTI.

If the uplink TPC command is received through the PDCCH, the user equipment applies the TPC command to the UL CC designated through the PDCCH (S912 and S918). It is assumed that the UL CC2 is designated through the PDCCH in the first type (S912) and the UL CC3 is designated through the PDCCH in the second type (S918). Afterwards, the user equipment performs uplink transmission with the adjusted transmission power if necessary (S914 and S920).

Alternatively, this embodiment may be used in a hybrid way with the embodiment of FIG. 8. For example, if a PDCCH including the uplink TPC command (for example, a TPC dedicated PDCCH) carries information used for indicating a UL CC to which a TPC will be applied, the user equipment may adjust the transmission power of the indicated UL CC. However, if the PDCCH including the uplink TPC command does not carry such information, the user equipment may adjust the transmission power of a UL CC corresponding to a downlink component carrier (DL CC) related with the PDCCH as in the embodiment of FIG. 8.

Figure 10:
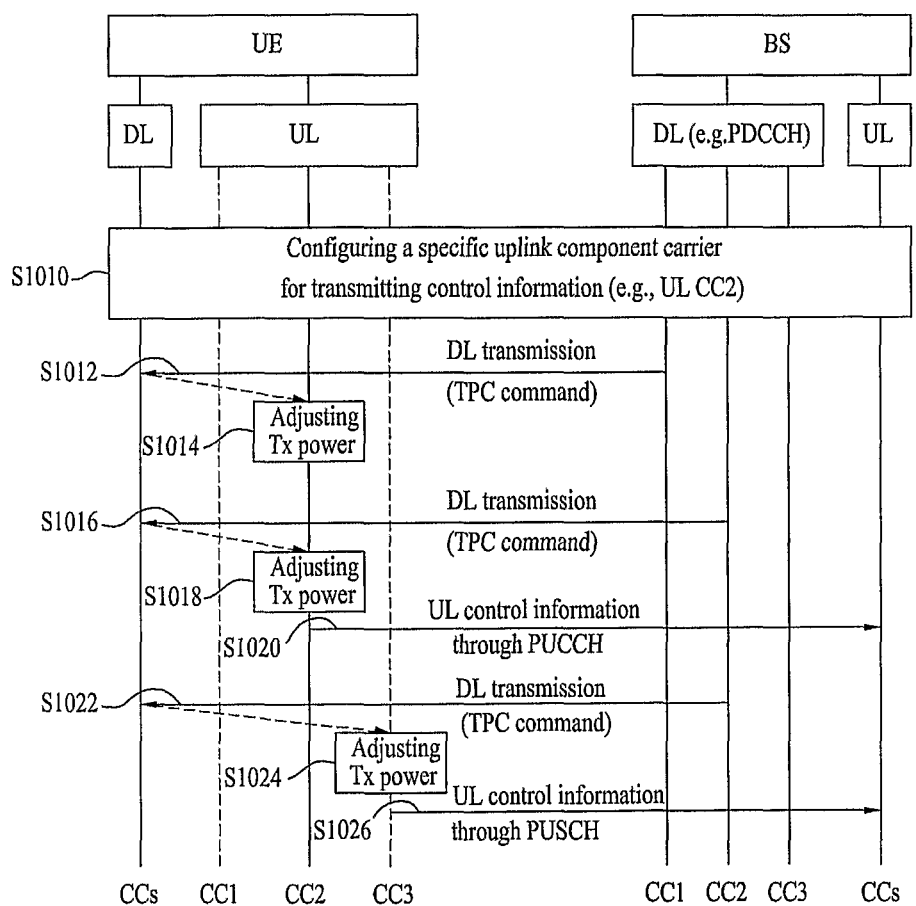

FIG. 10 illustrates a method of controlling transmission power in accordance with types of uplink signals. Since data are transmitted through a scheduled UL CC, the TPC command should be applied to the scheduled UL CC of the uplink. However, since the control information has low correlation with scheduling or no correlation with scheduling, in view of the PAPR or power control, it may be advantageous that the control information is uplink-transmitted through a specific UL CC only. Accordingly, this embodiment suggests that the TPC command related to the control information is automatically connected to a specific UL CC for transmitting control information. The control information includes a scheduling request (RS), a channel quality indicator (CQI), a rank index (RI), and HARQ acknowledgement/negative acknowledgement (ACK/NACK) information. In FIG. 10, it is assumed that ACK/NACK are transmitted to the uplink.

Referring to FIG. 10, the user equipment and the base station configure a specific uplink component (UL CC) for transmitting control information to the uplink (S1010). In this embodiment, it is assumed that UL CC2 is configured as a specific UL CC. For convenience, in FIG. 10, the specific UL CC is expressed with a solid line and the other UL CCs are expressed with dotted lines. The specific UL CC may be configured cell-specifically, or may be configured UE-specifically through RRC signaling. Also, the specific UL CC may be configured by a previously defined scheme using cell ID or UE ID. In this case, the specific UL CC may be configured in a cell unit, a UE group unit, and a UE unit. The previously defined scheme of configuring the specific UL CC can be time-varied.

Afterwards, the user equipment receives downlink control information carrying the TPC command through the PDCCH (S1012 and S1016). The downlink control information may be associated with the uplink physical channel (for example, PUCCH) to which the control information is transmitted. Also, the downlink control transmission may be associated with transmission of the control information from the user equipment to the uplink. For example, the downlink control information includes transmission power control command of the uplink physical channel for transmitting control information or uplink/downlink scheduling information. In this embodiment, it is assumed that the user equipment receives downlink scheduling information. In this case, although the downlink scheduling information is received through DL CC1 (S1012) or DL CC2 (S1016), downlink data indicated to the user equipment can be received through a PDSCH of another DL CC. For example, if the downlink scheduling information is associated with DL CC3 or includes a CC indicator designating DL CC3, the downlink scheduling information is received from the PDCCH of DL CC1 (S1012) or DL CC2 (S1016), and the downlink data is received through a PDSCH of DL CC3. In this case, the user equipment transmits acknowledgement information of the downlink data through a specific UL CC, i.e., UL CC2 (not shown), and applies the TPC command to the UL CC2 (S1014 and S1018).

For another example, the user equipment receives downlink transmission carrying the TPC command through the PDCCH of the DL CC2 (S1022). This embodiment is different from the aforementioned embodiment in that PUSCH transmission is performed through another UL CC (for example, UL CC3) at the time when control information (for example, acknowledgement information) is to be transmitted to the uplink. In this case, the user equipment can transmit the control information together with uplink data through the PUSCH of the UL CC3 in view of the PAPR or power control (S1026). Accordingly, the TPC command can also be applied to the UL CC3 to which control information is transmitted (S1024). For another example, if the control information is transmitted through the PUSCH on the UL CC in addition to the specific UL CC, the TPC command related to the control information can be ignored (not shown).

For another example, although the TPC command of the uplink physical channel (for example, PUCCH) for transmitting control information is only applied to the specific UL CC for transmitting control information, the TPC command of the uplink physical channel (for example, PUSCH) for transmitting data can be applied to UL CC to which the corresponding physical channel is transmitted. Accordingly, if the PDCCH that includes the TPC command of the PUCCH is distinguished from the PDCCH that includes the TPC command of the PUSCH, the TPC command of the PUCCH is only applied to UL CC for transmission of the PUCCH while the TPC command of the PUSCH is applied to UL CC to which the PUSCH is really transmitted.

Figure 11:
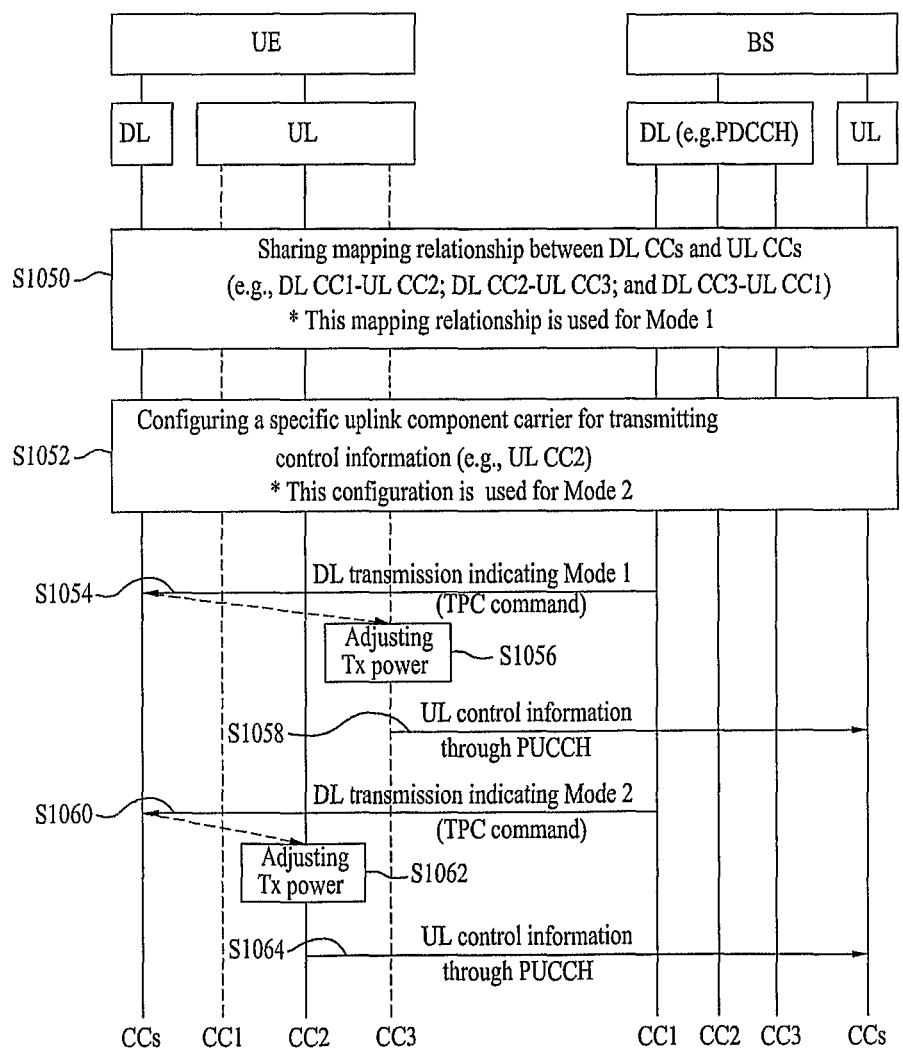

FIG. 11 illustrates a method of controlling transmission power in a hybrid manner of embodiments of FIG. 8 and FIG. 10. Descriptions of FIG. 8 and FIG. 10 can be referred for more detail explanation. Below description focused on how to control transmission power in a hybrid manner of embodiments of FIG. 8 and FIG. 10.

Referring to FIG. 11, the user equipment and the base station share information of the mapping relationship between the downlink component carrier (DL CC) and the uplink component carrier (UL CC) (S1050). In this embodiment, mapping relationship of the step S1050 may be used for Mode 1 of the hybrid manner. For description, it is assumed that component carriers are mapped with one another (DL CC1 to UL CC2, DL CC2 to UL CC3, and DL CC3 to UL CC1). Moreover, the user equipment and the base station configure a specific uplink component (UL CC) for transmitting control information to the uplink (S1052). In this embodiment, the specific uplink component configured in the step S1052 may be used for Mode 2 of the hybrid manner. It is assumed that UL CC2 is configured as a specific UL CC. For convenience, in FIG. 11, the specific UL CC is expressed with a solid line and the other UL CCs are expressed with dotted lines.

Afterwards, the user equipment receives downlink control information carrying the TPC command through the PDCCH (S1054 and S1060). The downlink control information may be associated with uplink physical channel (for example, PUCCH, PUCCH), preferably uplink physical control channel (for example, PUCCH). Also, the downlink control transmission may be associated with an uplink transmission of the control information from the user equipment. For example, the downlink control information includes transmission power control command of the uplink physical channel for transmitting control information or uplink/downlink scheduling information. In this embodiment, it is assumed that the user equipment receives downlink scheduling information.

In this embodiment, the downlink control information carrying the TPC command also carries information indicating a Mode in the hybrid manner (below, mode information). For example, if the downlink control information is received through a PDCCH of DL CC2 and indicates Mode 1 (S1054), the user equipment controls the PUCCH transmission power of the UL CC3 corresponding to the DL CC2 in accordance with the mapping relationship in the step S1050 (S1056). Then, if necessary, the user equipment may perform uplink transmission with the adjusted transmission power through PUCCH (S1058). For example, if the downlink control information is downlink scheduling information, the uplink transmission includes transmitting acknowledgement information of PDSCH (i.e. downlink data) indicated by the downlink scheduling information. Meanwhile, if the downlink control information is received through DL CC2 but indicates Mode 2 (S1060), the user equipment controls the transmission power of the specific UL CC for transmitting control information which is configured in the step S1052 (S1062). Then, if necessary, the user equipment may perform uplink transmission with the adjusted transmission power through PUCCH (S1064).

In the Mode 1, it is assumed the TPC command is applied to an UL CC corresponding to the DL CC via which the corresponding PDCCH is received. Alternatively, if the PDCCH is used for PDSCH scheduling, the TPC command may be applied to an UL CC corresponding to the DL CC via which the PDSCH scheduled by the PDCCH is received. For example, the PDCCH including the TPC command and a PDSCH scheduled by the PDCCH may be received through different DL CCs (e.g. PDCCH—DL CC1, PDSCH—DL CC2). In this case, if it is assumed that the TPC command is applied to an UL CC corresponding to the DL CC via which the PDSCH scheduled by the corresponding PDCCH, the user equipment may control the transmission power of the UL CC3 corresponding to the DL CC2 in accordance with the TPC command.

The information indicating a Mode of the hybrid manner (mode information) may be 1-bit information. The mode information may be explicitly signaled through PDCCH. For example, downlink control information (e.g. downlink scheduling information) include 1-bit field. Alternatively, The mode information may be implicitly signaled through PDCCH. For example, the mode information is designated in accordance with a scrambling scheme of the PDCCH or a cyclic redundancy check (CRC) masking scheme. Even though not shown in FIG. 11, the mode information is also signaled using RRC signaling or system information. In this case, the mode of the hybrid manner can be switched in a semi-static manner or cell-specific manner.

For convenience, embodiments of FIG. 8 to FIG. 11 are explained as separate schemes in each other. However these embodiments may be also operated together by selectively using a suitable embodiment in consideration of PDCCH type including the TPC command. For example, if the PDCCH is used for uplink scheduling (i.e. PUSCH scheduling), the TPC command may be applied to a UL CC for transmitting the PUSCH. If the PDCCH is used for downlink scheduling (i.e. PDSCH scheduling), the TPC command may be applied to a UL CC corresponding to a DL CC via which the PDCCH or the scheduled PDSCH is received. Alternatively, the TPC command may be applied to a UL CC for transmitting ACK/NACK in response to the PDSCH scheduling. If the PDCCH is dedicated for TPC command, the TPC command may be applied to an indicated UL CC when the PDCCH carries information of UL CC indicator, or may be applied to a UL CC corresponding to a DL CC via which the PDCCH is received when there is no such information.

As described above, the UL CC to which the TPC command will be applied may be determined automatically in accordance with the mapping relationship between the DL CC and the UL CC, or the UL CC may be determined explicitly or implicitly through the PDCCH. Also, the UL CC to which the TPC command will be applied may be determined by considering the type of the uplink signal. Hereinafter, it is assumed that the UL CC to which the TPC command will be applied is determined automatically in accordance with the mapping relationship between the DL CC and the UL CC. However, this is only exemplary, and in the following embodiments, the UL CC to which the TPC command will be applied may be determined using the method illustrated in FIG. 8 to FIG. 11. In this respect, steps of sharing information of the mapping relationship between the DL CC and the UL CC in the user equipment and the base station are expressed by dotted lines in the drawings which will be illustrated later.

Embodiment 2

Wideband TPC Scheme

Figure 12:
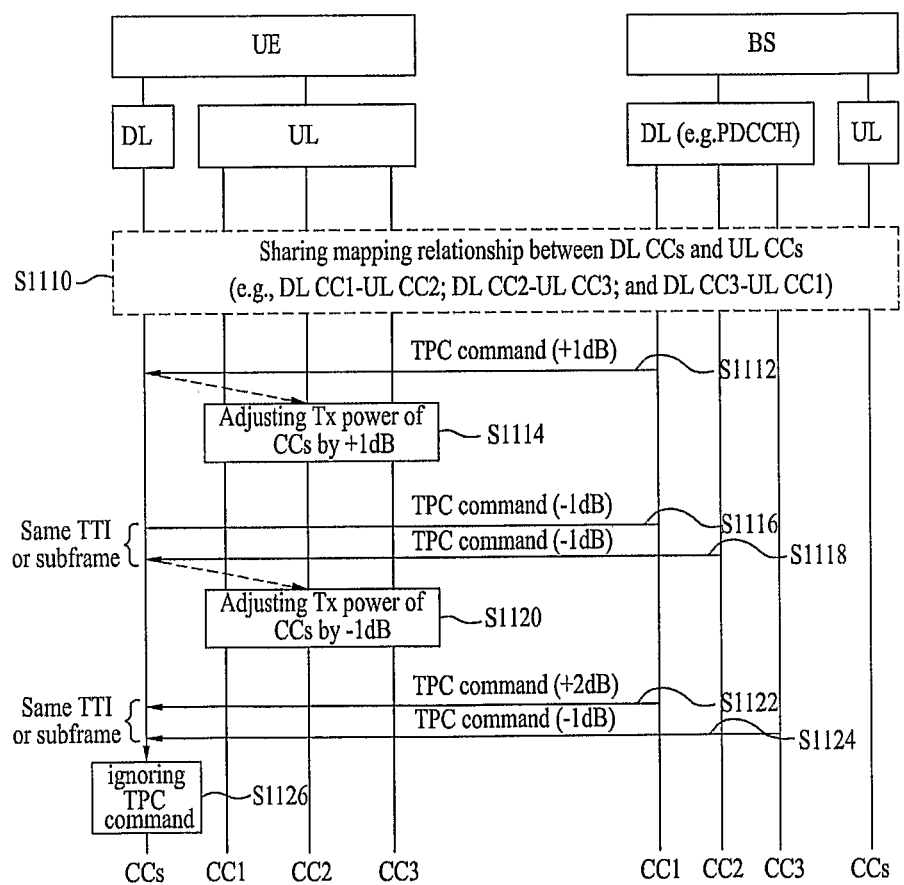
FIG. 12 is a diagram illustrating an example that transmission power is adjusted in a unit of a plurality of component carriers in accordance with the embodiment of the present invention.

FIG. 12 is a diagram illustrating an example that transmission power is adjusted in a unit of a plurality of component carriers in accordance with the embodiment of the present invention. This embodiment suggests that the TPC command transmitted through a control channel (for example, PDCCH) controls uplink transmission power in a unit of a plurality of component carriers (CCs). For convenience, the TPC command applied to a plurality of CCs will be referred to as a wideband TPC command. Although not limited to a specific embodiment, the wideband TPC command can be performed using an indicator indicating combination of UL CCs to which the TPC command is applied. Also, the wideband TPC command can be performed using a bitmap where each bit corresponds to UL CC. Also, the wideband TPC command can be performed in a unit of UC CC group previously shared between the base station and the user equipment. More specifically, this embodiment suggests that the wideband TPC command should control the transmission power of the uplink fullband of the user equipment. For convenience, a wideband TPC command applied to the uplink fullband can be also referred to as a fullband TPC command. For convenience, FIG. 12 illustrates a fullband TPC command.

Referring to FIG. 12, the user equipment receives a fullband TPC command at a certain time (S1112). In this embodiment, it is assumed that the fullband TPC command indicates increase of 1 dB. The user equipment increases the transmission power of each of UL CC1 to UL CC3 as much as 1 dB in accordance with the fullband TPC command (S1114). For another example, the user equipment can receive a plurality of PDCCHs that include the TPC command at the same or similar time (S1116 and S1118). The same or similar time includes the same transmission time interval (TTI), or the same subframe. One TTI can include one or more subframes. In this embodiment, it is assumed that a plurality of TPC commands indicate decrease of 1 dB. If the plurality of TPC commands are the same as one another, the user equipment adjusts the transmission power equally as if one fullband TPC command is received. Accordingly, the user equipment decreases the transmission power of each of UL CC1 to UL CC3 by 1 dB in accordance with the fullband TPC command (S1120). For another example, the user equipment can receive a plurality of PDCCHs that include the TPC command at the same or similar time (S1122 and S1124). In this embodiment, it is assumed that the plurality of TPC commands are different from one another (2 dB increase and 1 dB decrease). In this case, the user equipment can ignore the TPC commands received through the plurality of PDCCHs (S1126).

For easy understanding, this embodiment is explained using a wideband TPC command. However this embodiment can be applied whenever a plurality of TPC commands is associated with the same uplink component carrier at the same time. Thus it can be easily understood that this embodiment can be also applied to a case of using a TPC command of individual uplink component carrier (single CC TPC command). For example, in FIG. 12, it is assumed that the user equipment receives the single CC TPC commands through the same DL CC (e.g. DL CC2) at the steps S1116 to S1118 and the steps S1120 to S1124. Since DL CC2 is mapped with UL CC3 in accordance with the mapping relationship of the step S1110, the user equipment may try to adjust the transmission power of UL CC3 in accordance with the received TPC commands. In this case, if the TPC commands received at the same time indicate the same value, the user equipment may adjust the transmission power equally as if one TPC command is received. However if the TPC commands received at the same time indicate different values, the user equipment may ignore the TPC commands received through the plurality of PDCCHs.

Alternatively, this embodiment can be used in a situation when a single CC TPC command and a wideband TPC command indicate the same UL CC at the same time. If the two TPC commands indicate the same value, the user equipment may adjust the transmission power equally to the overlapped UL CC as if one TPC command is received. However, if two TPC commands indicate different values, three approaches are proposed as follows: first, simply ignoring both TPC commands; second, applying the single CC TPC command to the overlapped UL CC and the wideband TPC command to UL CC(s) other than the overlapped UL CC; and finally, applying the single CC TPC command only, i.e. ignoring the wideband TPC command. The third proposal may be preferred in consideration of that the single CC TPC command is anticipated to be carried through a PDCCH used for scheduling a PDSCH/PUSCH for a particular UE and the wideband TPC command is anticipated to be carried through a TPC dedicated PDCCH for UE group.

Embodiment 3

Switching Scheme Between a TPC Per Cc and a Wideband TPC

FIG. 13 to FIG. 16 are diagrams illustrating examples that transmission power control is switched in a unit of a single component carrier or a plurality of component carriers in accordance with the embodiment of the present invention. For convenience, a transmission power control scheme in a unit of a single component carrier and a transmission power control scheme in a unit of a plurality of component carriers will be referred to as a TPC per CC scheme and a wideband (or fullband) TPC scheme, respectively.

Figure 13:
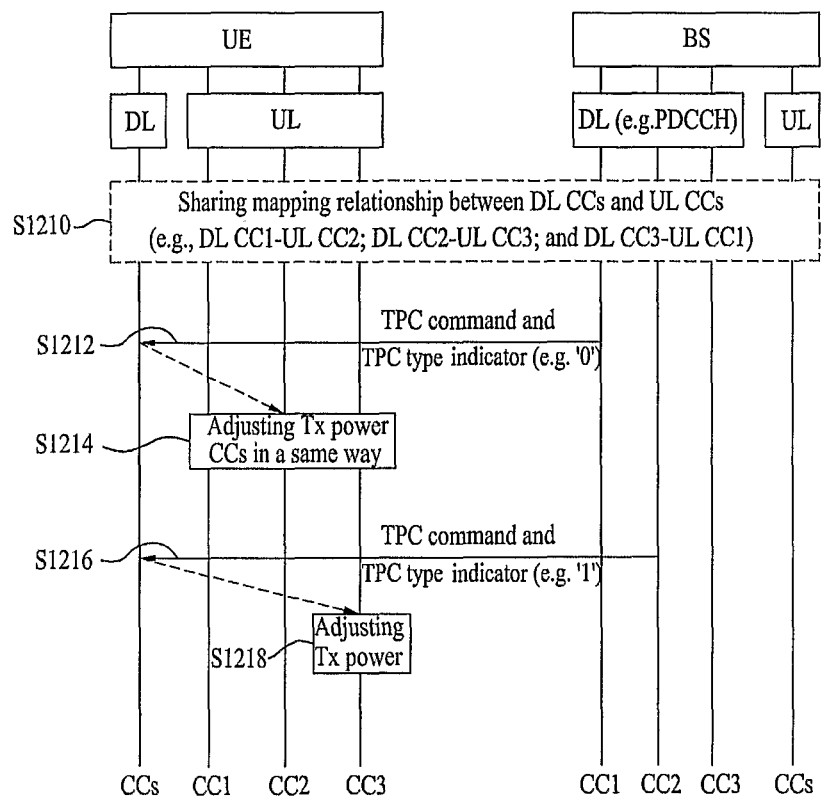
FIG. 13 to FIG. 16 are diagrams illustrating examples that transmission power control is switched in a unit of a single component carrier or a plurality of component carriers in accordance with the embodiment of the present invention.

FIG. 13 illustrates a switching example of a power control scheme using a TPC type indicator. Referring to FIG. 13, the user equipment receives a TPC command and a TPC type indicator through the PDCCH (S1212). The TPC type indicator indicates whether the TPC command is a TPC command per CC and a wideband (or fullband) TPC command. By using the TPC type indicator, the user equipment can dynamically switch the TPC per CC scheme and the wideband TPC scheme. For example, the TPC type indicator could be 1-bit information. In this embodiment, it is assumed that the wideband TPC scheme is used if the TPC type indicator is set to '0' while the TPC per CC scheme is used if the TPC type indicator is set to '1'. The TPC type indictor may be set in a reverse manner. Since the TPC type indicator is set to '0', the user equipment applies the TPC command received through the PDCCH to a plurality of UL CCs (or all UL CCs) (S1214). Meanwhile, the user equipment can also receive the TPC command and the TPC type indicator through the PDCCH at another time (S1216). In this case, since the TPC type indicator is set to '1', the user equipment can separately apply the TPC command to UL CC3 corresponding to DL CC2 (S1214). The TPC type indicator can be implicitly signaled. For example, the TPC type indicator can be transmitted indirectly or implicitly using PDCCH scrambling, cyclic redundancy check (CRC) masking, etc.

Figure 14:
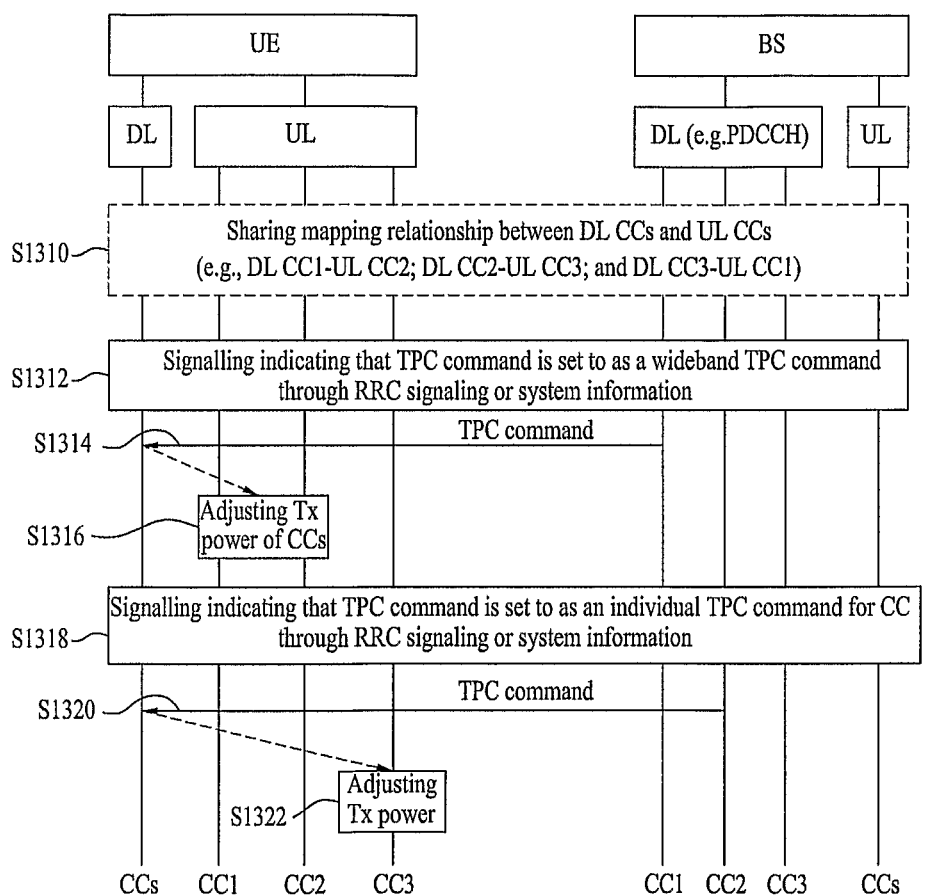

FIG. 14 illustrates a switching example of a power control scheme using RRC signaling or system information. Referring to FIG. 14, the user equipment can switch the TPC per CC scheme with the wideband (or fullband) TPC scheme UE-specifically through RRC signaling. Also, the user equipment can switch the TPC per CC scheme with the wideband (or fullband) TPC scheme cell-specifically through system information commonly broadcasted to all user equipments within a cell (S1312 and S1318). If the wideband TPC scheme is signaled (S1312), the user equipment applies the TPC command received through the PDCCH to a plurality of CCs (S1314 and S1316). In this embodiment, it is assumed that the TPC command is applied to two UL CCs. In this case, the UL CC1 and the UL CC2 to which the wideband TPC scheme is applied could be UL CC group for the wideband TPC scheme. The UL CC group for the wideband TPC scheme can previously be shared between the base station and the user equipment. For example, the UL CC group for the wideband TPC scheme may be designated cell-specifically through a broadcast message (for example, system information) or UE-specifically through RRC message. In this case, a UL CC group indicator indicating combination of the UL CC group or a bitmap can be used. Also, the UL CC group for the wideband TPC scheme may be designated indirectly or implicitly using the number of UL CCs, a bandwidth of each UL CC, cell ID, UE ID, etc. Meanwhile, if the TPC per CC scheme is signaled (S1318), the user equipment separately applies the TPC command to the UL CC corresponding to the DL CC where the PDCCH is received (S1320 and S1322). The aforementioned switching scheme can be applied to all formats of the PDCCH to which the TPC command is transmitted, or to only a part of the PDCCH formats.

Figure 15:
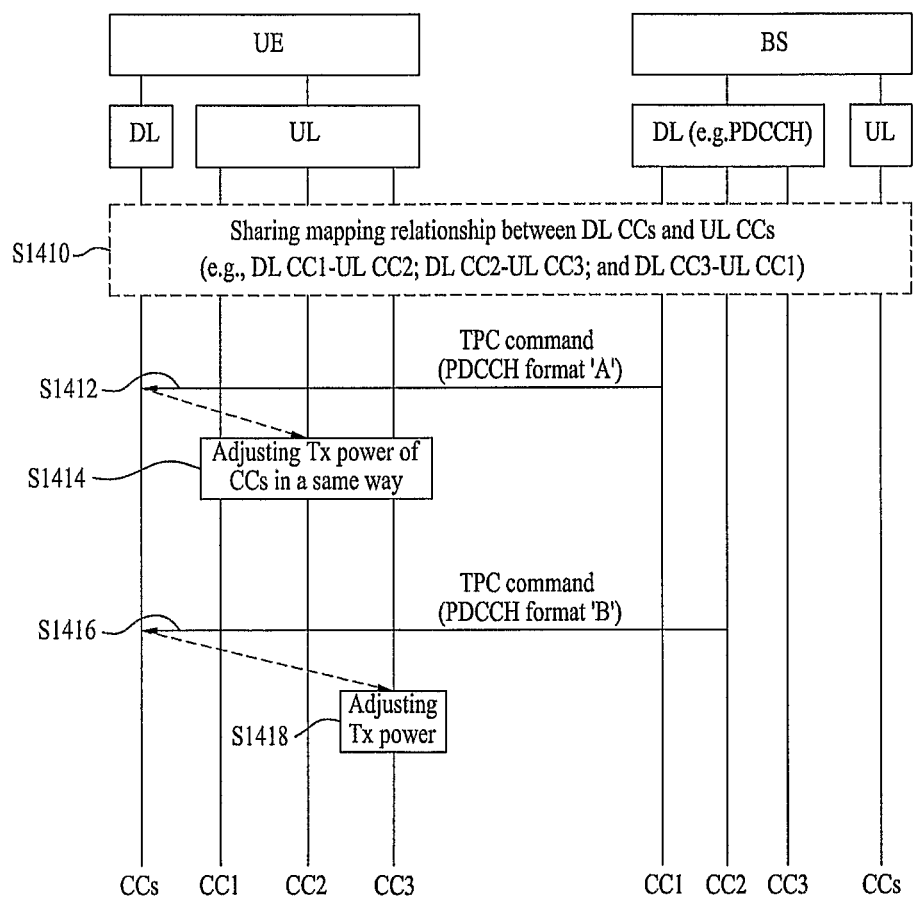
Figure 16:
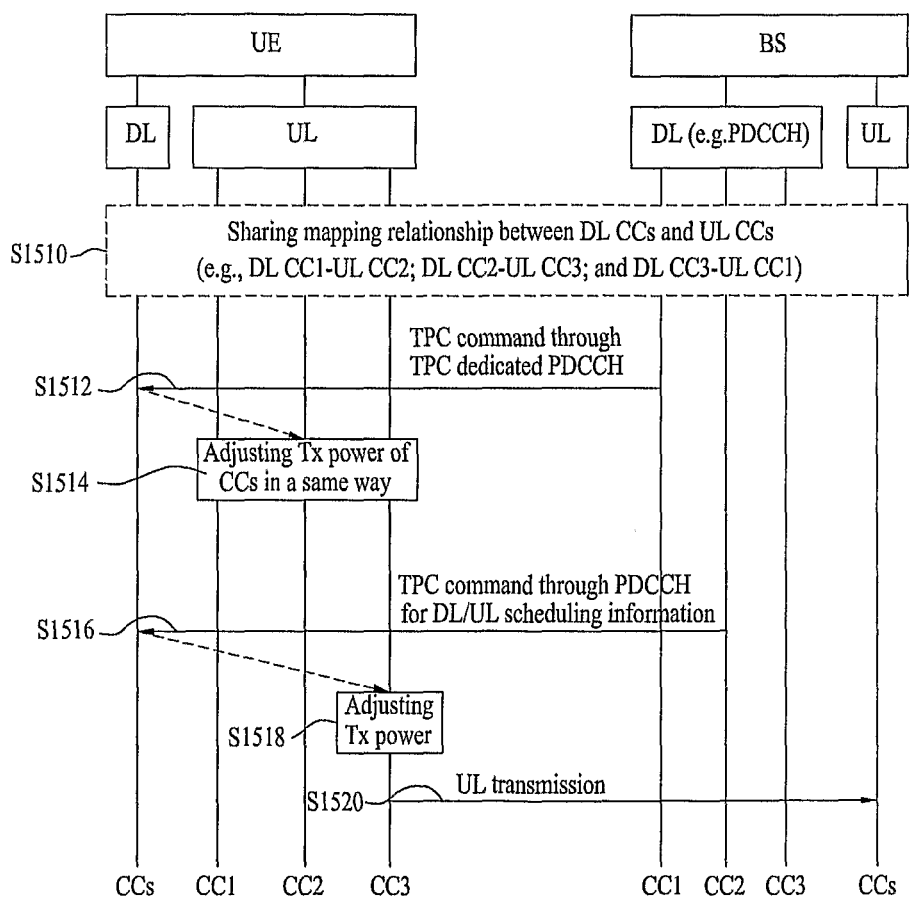

FIG. 15 and FIG. 16 illustrate switching examples of a power control scheme using a PDCCH format. As the TPC per CC scheme is switched to the wideband (or fullband) TPC scheme using the PDCCH format, overhead load due to PDCCH signaling, RRC signaling or broadcasting can be reduced. The PDCCH format applied to the TPC per CC scheme and the PDCCH format applied to the wideband (or fullband) TPC scheme can previously be divided from each other in accordance with the embodiment.

Referring to FIG. 15, the PDCCH format 'A' indicates that the TPC command is a wideband (or fullband) TPC command. Also, the PDCCH format 'B' indicates that the TPC command is a TPC per CC command. The PDCCH formats 'A' and 'B' are to indicate the TPC command type, and can carry same types/contents of downlink control information. For example, although the PDCCH formats 'A' and 'B' indicate different types of TPC commands, they can be used for downlink scheduling. The PDCCH formats can be divided from each other by varying at least one of length of downlink information, scrambling code and CRC masking scheme. Accordingly, if the TPC command is received through the PDCCH format 'A' (S1412), the user equipment applies the TPC command to a plurality of UL CCs (S1414). Meanwhile, if the TPC command is received through the PDCCH format 'B' (S1416), the user equipment separately applies the TPC command to the UL CC corresponding to the DL CC where the PDCCH is received (S1418).

Referring to FIG. 16, the user equipment should receive the PDCCH of various formats in accordance with a type of downlink control information (DCI) carried in the PDCCH. Specifically, the user equipment should receive the PDCCH of various formats such as a format for downlink scheduling, a format for uplink scheduling, a TPC dedicated format for an uplink data channel (for example, PUSCH), and a TPC dedicated format for an uplink control channel (for example, PUCCH). It is noted that FIG. 16 is different from FIG. 15 in that the PDCCH formats are divided in accordance with types/contents of the DCI. This embodiment suggests that the PDCCH formats are previously divided from each other as to whether to transmit the TPC per CC command or the wideband (or fullband) TPC command. In this case, the user equipment can perform the TPC per CC operation or the wideband (or fullband) TPC operation in accordance with the received PDCCH format.

Specifically, since the PDCCH format for uplink scheduling controls PUSCH transmission through the scheduled UL CC, it can be used to transmit the TPC per CC command. Also, since the TPC dedicated PDCCH format for an uplink data channel (for example, PUSCH) can be transmitted at a random time regardless of uplink scheduling, it can be used to transmit the wideband (or fullband) TPC command. Also, the PDCCH format for downlink scheduling accompanies with uplink ACK/NACK transmission through a specific UL CC in accordance with downlink data reception, it can be used to transmit the TPC per CC command. Moreover, since the TPC dedicated format for an uplink control channel (for example, PUCCH) can be transmitted at a random time regardless of uplink scheduling, it can be used to transmit the wideband (or fullband) TPC command. In FIG. 16, if the TPC command is received through the TPC dedicated PDCCH format (S1512), the user equipment applies the TPC command to a plurality of UL CCs (S1514). Meanwhile, if the TPC command is received through the PDCCH format for scheduling (S1516), the user equipment separately applies the TPC command to the UL CC3 corresponding to the DL CC2 where the PDCCH is received (S1518).

Figure 17:
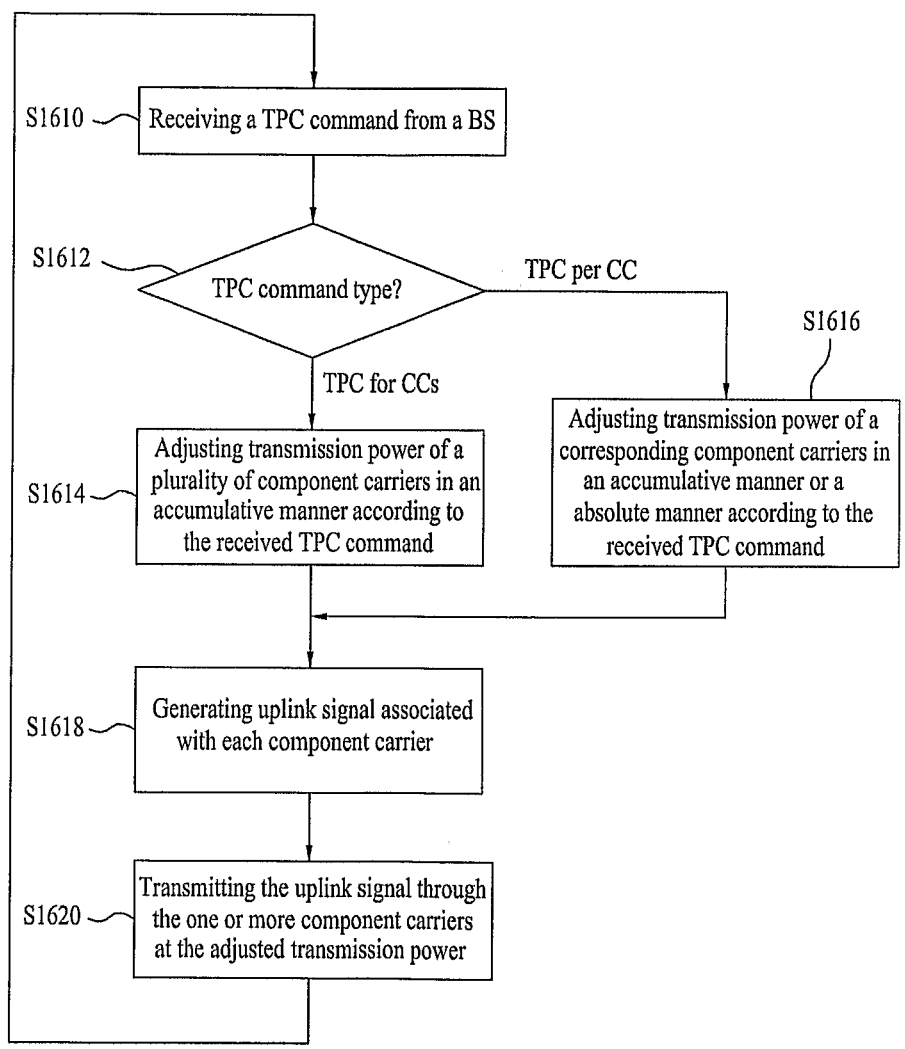
FIG. 17 is a diagram illustrating an example that power is adjusted in accordance with a type a transmission power control (TPC) command of the embodiment of the present invention.

FIG. 17 is a diagram illustrating an example that power is adjusted in accordance with a type of a transmission power control (TPC) command in the embodiment of the present invention.

Referring to FIG. 17, the user equipment receives the TPC command from the base station (BS) (S1610). The TPC command can be received through a control channel, for example, PDCCH. The TPC command can be received through the TPC dedicated PDCCH or the PDCCH for uplink/downlink scheduling. Also, the TPC command can be included in a response message to a random access preamble. Moreover, the TPC command can be received through a ranging process. The TPC command may be indicated in a unit of user equipment or user equipment group. Afterwards, the user equipment determines whether the TPC command is a wideband (or fullband) TPC command for a plurality of component carriers (CCs) or a TPC per CC command (S1612).

The power control scheme can be divided into an accumulative scheme and an absolute value scheme. In the accumulative scheme, uplink transmission power used by the user equipment at a random time is the power accumulated until the random time or the power obtained by accumulating the TPC command received before a given time from the random time. For example, if the user equipment receives a power increase command four times until the random time, the uplink transmission power at the random time or after the lapse of a given time from the random time becomes the power obtained by increasing the power four times. Unlike this, in the absolute value scheme, uplink transmission power used by the user equipment at a random time is set as a value indicated by the TPC command received at the random time or received previously before the random time.

This embodiment suggests power control of the accumulative scheme in the wideband TPC scheme when the wideband (or fullband) TPC scheme and the TPC per CC scheme are used together. Namely, since the wideband TPC scheme can be applied when path loss between the user equipment and the base station has been decreased or increased for wideband, and is suitable for relatively slow path loss variation, the accumulative scheme is applied to the wideband TPC scheme. The TPC per CC scheme can adjust the transmission power using the accumulative scheme or the absolute scheme in addition to the uplink transmission power adjusted by the wideband TPC scheme. Accordingly, if the TPC command type is the wideband TPC command, the user equipment adjusts the transmission power of a plurality of uplink component carriers in accordance with the TPC command (S1614). By contrast, if the TPC command type is the TPC per CC command, the user equipment adjusts only the transmission power of the corresponding uplink component carrier in accordance with the TPC command (S1616).

Afterwards, the user equipment generates a signal to be transmitted to the uplink through the corresponding component carrier in accordance with scheduling by the base station or a previously determined/signaled rule or method (S1618). The signal can be generated using various wireless access schemes such as OFDMA, SC-FDMA, and MC (multi carrier)-FDMA. Preferably, the signal can be generated using SC-FDMA or MC-FDMA. Afterwards, the user equipment transmits the generated signal to the uplink through one or more corresponding component carriers using the power adjusted in step S1614 or S1616 (S1620). Then, if the TPC command is additionally received from the base station, the user equipment can repeat the steps S1610 to S1620.

Figure 18:
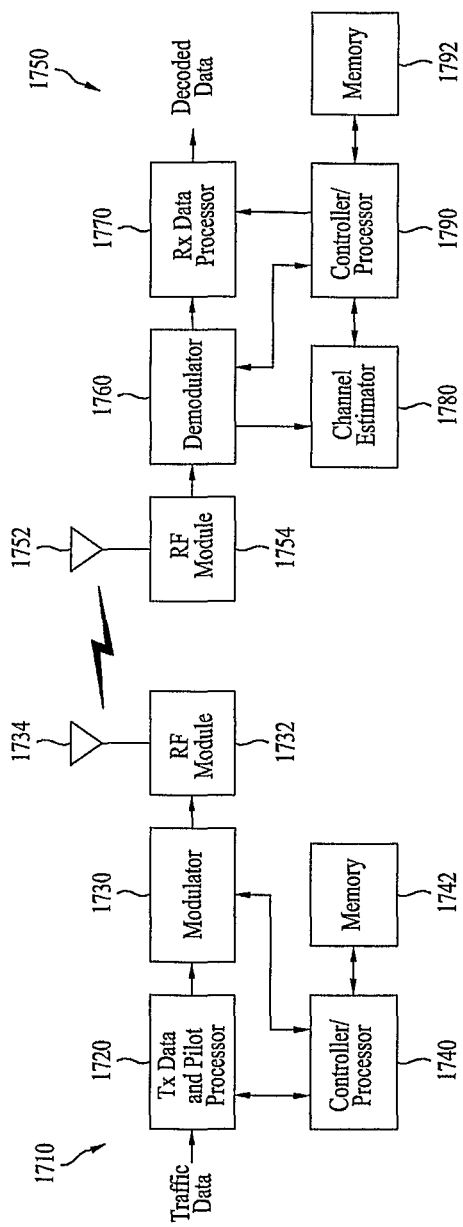
FIG. 18 is a block diagram illustrating a transmitter and a receiver according to one embodiment of the present invention.

FIG. 18 is a block diagram illustrating a transmitter and a receiver according to one embodiment of the present invention. In the downlink, the transmitter 1710 is a part of the base station and the receiver 1750 is a part of the user equipment. In the uplink, the transmitter 1710 is a part of the user equipment and the receiver 1750 is a part of the base station.

Referring to FIG. 18, a Tx data and pilot processor 1720 of the transmitter 1710 generates data symbols by encoding, interleaving and symbol-mapping data (for example, traffic data and signaling). Also, the pilot processor 1720 generates pilot symbols and multiplexes the data symbols and the pilot symbols. A modulator 1730 generates transmission symbols in accordance with a wireless access scheme. Examples of the wireless access scheme include FDMA, TDMA, CDMA, SC-FDMA, MC-FDMA, OFDAM or their combination. A radio frequency (RF) module 1732 generates the transmission symbols as RF signals through an antenna 1734 by performing signal processing (for example, analog conversion, amplification, filtering, and frequency uplink conversion). The power of the symbols transmitted to the receiver 1750 can be adjusted in accordance with various schemes. For example, the transmission power of the symbols can be adjusted by applying a weight value to an input value to the modulator 1730 or an output value from the modulator 1730. Also, the transmission power of the symbols can be adjusted by the RF module 1732. A controller/processor 1740 analyzes the transmission power control (TPC) command received from the receiver 1750, and performs signal processing and controls each module to adjust the transmission power of the component carriers in accordance with the analyzed TPC command. A memory 1742 stores program codes and data.

In the receiver 1750, an antenna 1752 receives signals transmitted from the transmitter 1710 and provides the received signals to an RF module 1754. The RF module 1754 provides input samples by performing signal processing (for example, filtering, amplification, frequency downlink conversion, and digitalization) for the received signals. A demodulator 1760 provides data values and pilot values by demodulating the input samples. A channel estimator 1780 calculates a channel estimation value based on the received pilot values. Also, the demodulator 1780 performs data detection (or equalization) for the data values received using the channel estimation value, and provides data symbol estimation values for the transmitter 1710. An Rx data processor 1770 performs symbol demapping, deinterleaving and decoding for the data symbol estimation values and provides the decoded data. Generally, in the receiver 1750, processing of the demodulator 1760 and the Rx data processor 1770 is complementary to processing of the modulator 1730 and the Tx data and pilot processor 1720 in the receiver 1750. The controller/processor 1790 manages and controls the operation of the modules existing in the receiver 1750. The controller/processor 1790 performs signal processing and controls each module to transmit the transmission power control command of the component carriers to the transmitter 1710 by considering channel status, service quality request, etc. A memory 1792 stores program codes and data.

The modules illustrated in FIG. 18 are illustrative, and the transmitter and/or the receiver may further include necessary modules, wherein some modules/functions may be omitted or divided into different modules, or two or more modules may be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus of controlling uplink transmission power when a plurality of uplink/downlink component carriers configure uplink/downlink.

What is claimed is:

1. A method of controlling uplink transmission power by a user equipment in a wireless communication system that supports carrier aggregation, the method comprising:
    receiving a first transmission power control (TPC) command for plural configured uplink component carriers (UL CCs) at a subframe via a first downlink component carrier (DL CC);
    receiving a second TPC command for the plural configured UL CCs at the subframe via a second DL CC, wherein the second DL CC is different from the first DL CC; and
    performing, by the user equipment, a procedure for adjusting transmission powers of the plurality of configured UL CCs based on the first and second TPC commands,
    wherein, if the first TPC command and the second TPC command indicate different values, the first and second TPC commands are ignored, and the transmission powers of the plural configured UL CCs are maintained as previous transmission powers of the plural configured UL CCs.

2. The method of claim 1, wherein the first TPC command and the second TPC command are received through physical downlink control channels (PDCCH).

3. A user equipment for use in a wireless communication system that supports carrier aggregation, the user equipment comprising:
    a radio frequency (RF) module; and
    a processor, wherein the processor is configured to:
        receive a first transmission power control (TPC) command for plural configured uplink component carriers (UL CCs) at a subframe via a first downlink component carrier (DL CC),
        receive a second TPC command for the plural configured UL CCs at the subframe via a second DL CC, wherein the second DL CC is different from the first DL CC, and
        perform a procedure for adjusting transmission powers of the plurality of configured UL CCs based on the first and second TPC commands,
    wherein, if the first TPC command and the second TPC command indicate different values, the first and second TPC commands are ignored, and the transmission powers of the plural configured UL CCs are maintained as previous transmission powers of the plural configured UL CCs.

4. The user equipment of claim 3, wherein the first TPC command and the second TPC command are received through physical downlink control channels (PDCCH).

* * * * *